United States Patent
Schick

[11] Patent Number: 5,816,035
[45] Date of Patent: Oct. 6, 1998

[54] MOWER DECK MOUNTING SYSTEM

[75] Inventor: Scott Schick, Corydon, Iowa

[73] Assignee: Shivvers, Inc., Corydon, Iowa

[21] Appl. No.: 587,938

[22] Filed: Jan. 17, 1996

[51] Int. Cl.$^6$ .................................................. A01D 34/63
[52] U.S. Cl. .......................... 56/15.2; 56/15.8; 56/320.1; 56/17.1; 56/DIG. 10; 56/DIG. 22
[58] Field of Search ................... 56/15.2, 15.1, 56/15.6, 15.8, 17.1, 17.2, 320.1, DIG. 10, DIG. 3, DIG. 22; 180/19.1, 19.3

[56] References Cited

U.S. PATENT DOCUMENTS

| | | | |
|---|---|---|---|
| 3,796,028 | 3/1974 | Federspiel | 56/15.2 |
| 4,325,210 | 4/1982 | Marto | 56/15.8 |
| 4,429,515 | 2/1984 | Davis, Jr. et al. | |
| 4,563,019 | 1/1986 | Kuhn et al. | |
| 4,650,206 | 3/1987 | Mathis | |
| 4,760,686 | 8/1988 | Samejima et al. | |
| 4,779,406 | 10/1988 | Schroeder | |
| 4,817,724 | 4/1989 | Schmid et al. | 56/DIG. 22 X |
| 4,829,754 | 5/1989 | Schimamura et al. | |
| 5,025,617 | 6/1991 | Kuhn et al. | 56/DIG. 22 X |
| 5,079,907 | 1/1992 | Sameshima et al. | |
| 5,475,971 | 12/1995 | Good et al. | 56/15.2 X |

Primary Examiner—Randolph A. Reese
Assistant Examiner—Heather Shackelford
Attorney, Agent, or Firm—Litman, McMahon and Brown, L.L.C.

[57] ABSTRACT

A front mounted mower deck includes a mounting and support assembly for operably joining the deck to a motorized vehicle. The mounting and support assembly includes a pair of pusher bars swivelly attached at one end to the deck and at the opposite end to the vehicle. A hanger is pivotally mounted on each pusher bar and includes a slot which receives a slot follower mounted on the deck to allow articulation from side to side by movement of the slot followers in the slots. Each hanger is biased to maintain an associated slot follower in the slot therefor. However, the hanger can be manually manipulated to overcome the biasing force so that the slot followers are released from the slots, thereby allowing the deck to be rotated about the connection with the pusher bars to provide for cleaning, maintenance, etc. A height adjustment mechanism cooperates with the mounting and support assembly to allow simultaneous adjustment of the mower cutting height on both sides of the front and back of the mower from a single location.

13 Claims, 4 Drawing Sheets

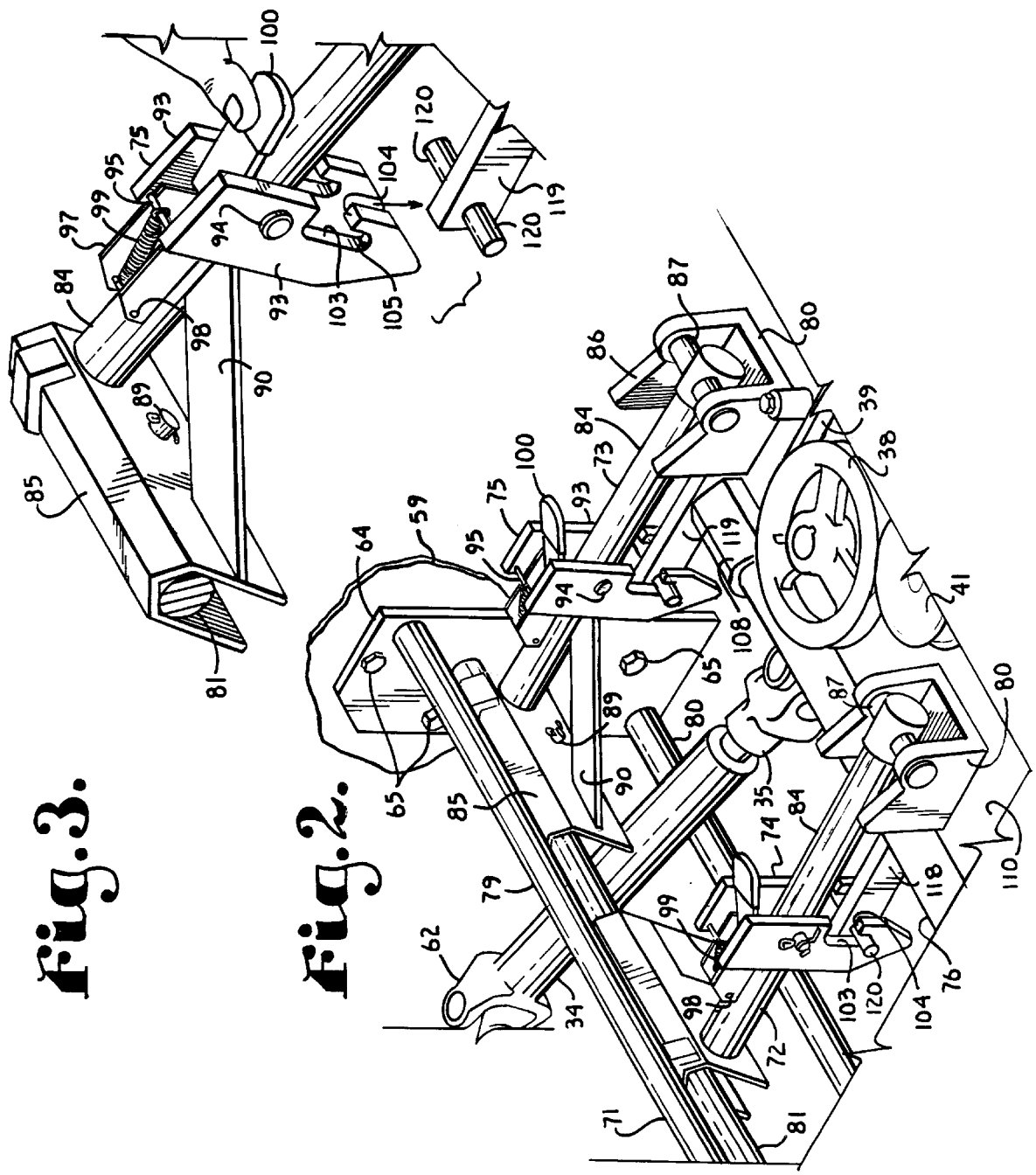

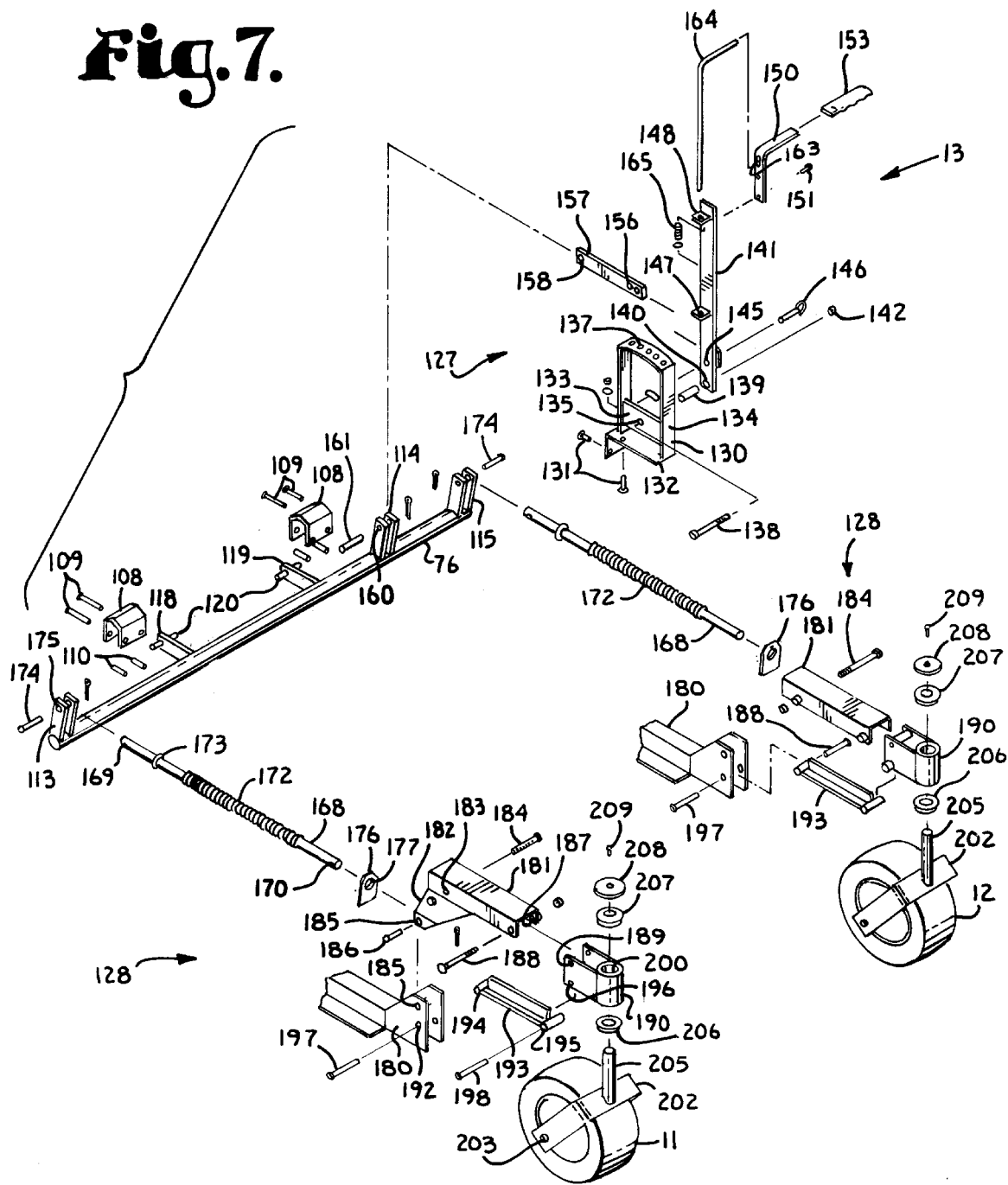

MOWER DECK MOUNTING SYSTEM

BACKGROUND OF THE INVENTION

The present invention is directed to a front mounted mower deck and, in particular, to a mower deck mounting system and suspension that cooperate with a motorized vehicle to allow the mower deck to follow the contour of the ground being traversed by the mower from both side to side and back to front, yet allow the deck to be easily raised to allow for repair, maintenance and cleaning and allow the cutting height of the deck to be adjusted at a single location.

Front mounted mowers are commercially available in many different types. For example, front mounted mowers are available for attachment to ATVs, tractors and perhaps the most commonly are manufactured in conjunction with a self propelled, single purpose dedicated vehicle for propelling the mower.

Because such front mounted mowers are effectively pushed by some type of driving or motorized vehicle, linkage must be provided to connect the mower to the drive vehicle that both is firm enough in nature to effectively push the mower across the surface to be mowed, but does not allow the mower to rise in front during cutting which would present a substantial hazard to persons operating the device or other persons in the immediate vicinity of the mower.

Furthermore, it is desirable that the mower be able to articulate about the center thereof. That is that the mower be able to swing from side to side and from front to back independent of the drive vehicle in conformance with the contour of the terrain being traversed by the mower, so that the mower can cut at a relatively even level without leaving some grass extremely long and other grass scalped to the ground.

Front mounted mowers have been provided in the past that have at least some degree of flexibility. However, it is also desirable that front mounted mowers be able to be raised so that the underside is exposed for maintenance, repair or cleaning thereof. The mowers that have provided some degree of articulation in the past have been associated with relatively complex cumbersome apparatus for allowing the mower to be raised to an upright position. Most frequently, a substantial part of the mower must be disassembled in order to easily raise the mower to an upright or maintenance configuration.

Other front mounted mowers have provided a system for allowing the mower deck to be raised comparatively easily, but have done so at the expense of flexibility and are able to be articulated in only a single dimension or not at all. Consequently, it is desirable to provide a front mounted mower deck which has the combined features of being able to be easily raised or flipped to an upright position for maintenance or the like, yet allowing the deck to also follow the contour of the ground in two dimensions.

It is also highly desirable that a user of the device be able to manipulate the mower deck from a cutting configuration to a raised maintenance configuration by relatively quick and easy operations and without the need for tools.

Another feature associated with front deck mowers that can be extremely troublesome is the height adjustment for the cutting blades relative to the ground. For proper adjustment, the height must be able to be set both in the front and back on both sides of the device. On many mower structures, this means that four separate adjustments must be made and with some mowers this even requires tools in order to loosen adjustment screws or the like to reset the height. Consequently, it is also desirable to have a height adjustment mechanism which operates at a single location, especially from a single handle or the like, and which allows a user of the mower to quickly and efficiently readjust the cutting height for the mower from a single location and without the need for tools.

Finally, it is preferable that the height adjustment mechanism be able to work in cooperation with the mounting linkage to allow the height adjustments to be made while still maintaining flexibility with the ability to articulate from side to side at the back end of the structure. Such cooperation allows three main advantages to be associated with the deck which are that the deck is ground following, that the deck is easily raised to a maintenance position and that the deck has a highly efficient height adjustment which is controllable from a single location to all be incorporated into a single mower deck.

SUMMARY OF THE INVENTION

A front mounted mower deck includes mounting and support assembly for quickly joining the deck to a motorized vehicle. The assembly includes a pair of push bars having down hangers and a cooperating lift bar. The push bars pivotally attach to the mower deck. The down hangers depend from the push bars and each bar has a vertical slot therein. The lift bar is pivotally attached to and extends laterally along the rear of the mower deck. The lift bar includes a pair of lever arm mounted slot followers that are each cooperatively captured in a respective slot during operation, so as to allow the rear of the mower deck to articulate from side to side and from front to back by movement of the slot followers in their respective slots.

The hangers are spring biased to push against the slot followers during operation to maintain the slot followers in the slots. However, the hangers can be manipulated by simple application of manual pressure by an operator to swing the hangers and allow release of the slot followers from the slots through openings therein, such that the mower deck can then be easily rotated about the connection of the push bars with the deck to allow the deck to rotate between a lowered configuration and a raised configuration wherein repairs, maintenance and cleaning can be easily performed on the underside of the deck.

The deck also includes a height adjustment mechanism that cooperatively sets the cutting height on both sides of both the front and the rear of the mower deck simultaneously. The height adjustment mechanism includes a single location operator device, such as a handle that is operably linked to rotate the lift bar and to raise and lower front wheels of the deck simultaneously. In particular, the slot followers are positioned near distal ends of respective lever arms that are in turn attached to the lift bar. When the lift bar rotates, the slot followers are rotated and cause the deck to raise or lower thereabout. At the same time linkage connects a second set of lever arms on the lift bar to the front wheels so as to relatively raise or lower the deck relative to the front wheels at the same time as the rear of the deck raises or lowers. The height adjustment mechanism sets a preferred height and the slot and slot follower system allows the deck to articulate relative to the set cutting height to adjust for the variation in the terrain.

Consequently, the mower deck mounting and support assembly allows the deck to be articulated so as to be ground following from both side to side and front to rear while also being able to be easily raised by manual manipulation of various parts thereof to allow easy raising of the deck for maintenance, cleaning, repair, etc. Further, the height adjustment mechanism functions in cooperation with the other elements to allow adjustment of the cutting height on both sides of the front and back of the mower deck by operation of a single operator handle.

OBJECTS OF THE PRESENT INVENTION

Therefore, the objects of the present invention are: to provide a mower having a motorized drive vehicle and a front mounted mower connected to the drive vehicle by support structure including a mechanism to allow the mower assembly to articulate from both side to side and front to back independent of the drive vehicle so as to follow the contour of ground being traversed by the mower deck; to provide such a mower deck including a hinge and a rear deck release mechanism to allow the mower deck to be easily manipulated and swung from a cutting configuration to a raised configuration for cleaning, repair and other maintenance; to provide such a mower deck including a height adjustment mechanism to allow the cutting height of the mower deck to be adjusted from a single location through manipulation of a handle by a user without the need for tools and in cooperation with the support mechanism allowing articulation of the mower; to provide such a mower wherein the articulation mechanism includes a pair of hangers having vertical slots therein and wherein the mower deck includes a pair of rearwardly extending slot followers that are cooperatively received by the slots to allow relative vertical movement of the rear of the mower deck from side to side and relative movement compared to the front of the mower deck from front to back; to provide such hangers that are spring biased and easily manipulated to release the rear of the mower deck to allow raising of the mower deck; to provide such a mower deck having an articulation mechanism including a rear lift bar both operatively connected to the height adjustment mechanism and to the hanger slot followers so as to simultaneously allow adjustment of the general cutting height of the mower on both sides of the front and back while still allowing articulation of the rear of the mower from side to side; to provide a support mechanism including a hinge that allows raising of the mower deck when the slot followers are released from the hanger slots; and to provide such a mower which is relatively easy to construct, inexpensive to produce and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged, fragmentary and perspective view of a portion of the mower deck and mounting assembly.

FIG. 3 is an enlarged, fragmentary and perspective view of the mounting assembly illustrating operation of a hanger release mechanism to release a slot follower from a hanger.

FIG. 7 is a perspective and exploded view of a height adjustment assembly associated with the mower deck.

DETAILED DESCRIPTION OF THE INVENTION

Figure 1:
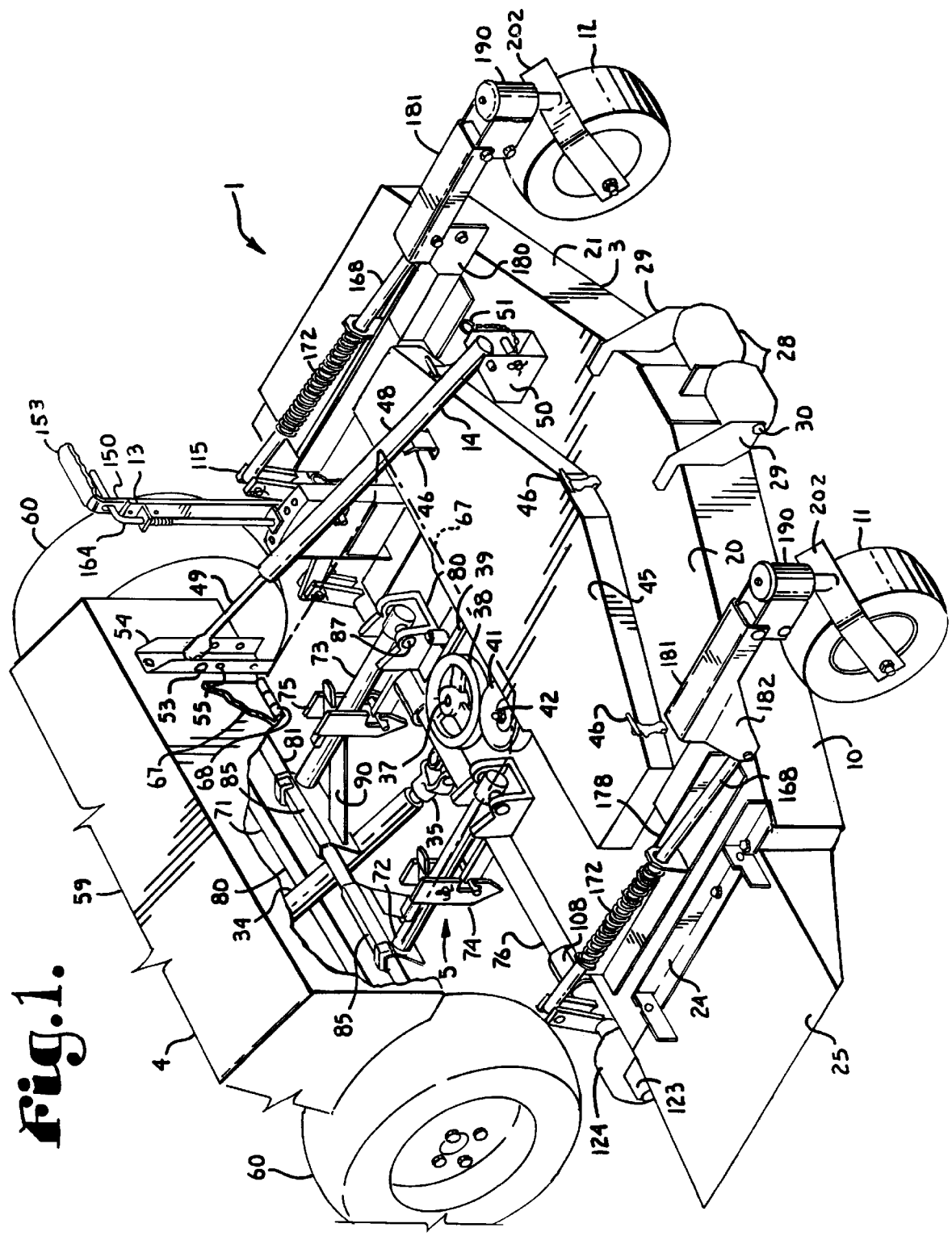
FIG. 1 is a fragmentary perspective view of a mower illustrating a portion of a motorized drive vehicle, a front mounted mower deck and a mounting assembly therefor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a mower in accordance with the present invention. The mower 1 includes a front mounted deck 3, a motorized drive vehicle 4 and a mounting and support assembly 5.

The mower deck 3 includes a mower housing 10, a pair of front caster wheels 11 and 12, a mower height adjustment assembly 13 and a shock assembly 14.

Figure 4:
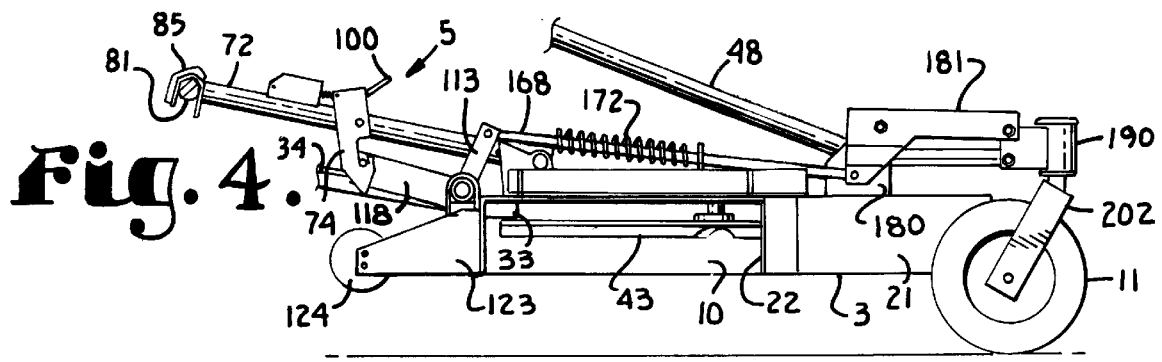
FIG. 4 is a fragmentary and side elevational view of the mower deck and mounting assembly showing the mower deck in a cutting or lowered configuration thereof.

The mower housing 10 includes a main upper plate 20 and a skirt 21 depending on three sides from the upper plate 20. On the fourth side of the upper plate 20 and to the right side of an operator of the mower 1 is an exhaust opening 22. Note that for directional terms used herein that the term "front" refers to the right in FIG. 4 and left and right sides refer to the orientation of a user facing to the front. Attached to the upper plate 20 above the exhaust opening 22 is an outlet stiffener 24 which is in turn secured to an exhaust chute 25 for directing cut grass and the like from beneath the mower deck 3 to the side thereof. Mounted on the front of the housing 10 and approximately in the middle thereof is a pair of rollers 28 supported by struts 29 and rotatably secured in place by a cap screw 30. The rollers 28 help prevent the center of the housing 10 from bottoming out on a rise in the terrain that occurs between the wheels 11 and 12.

Mounted on the underside of the deck housing 10 near the rear thereof is a gear box 33 which is in turn connected on the side thereof to a drive shaft 34 by a universal joint 35. The opposite end of the gear box 33 is connected by a shaft 37 to a drive pulley 38. The drive pulley 38 is mounted on top of the housing 10 and is freely rotatable relative to the housing 10.

A drive belt 39 is operably driven by the drive pulley 38 and in turn passes around and operably turns a plurality of blade pulleys 41, one of which is seen in FIG. 1. Each of the drive pulleys 41 is rotatably mounted on the housing 10 or a shaft 42 which passes through the housing 10 and is rotatable therewith. Each shaft 42 is connected to a mower blade 43. In this manner the mower blades 43 are operably rotated beneath the housing 10 by rotation of the drive shaft 34. A cover 45 covers a portion of the housing 10 and certain of the blade pulleys 41 as well as a portion of the drive belt 39. The cover 45 is removable by operation of tabs 46.

The shock assembly 14 includes an air and oil cylinder 48 having a reciprocating piston 49; however, it is foreseen that other shock absorbing devices such as a compressed gas cylinder may be used for the same purpose. One end of the cylinder 48 is pivotally secured to the top of the housing 10 by a clevis mounting bracket 50. The cylinder 48 is secured to the bracket 50 by a manually removable clevis pin 51. The opposite end of the shock assembly 14 is secured by a manually removable clevis pin 53 to a bracket 54 secured to the drive vehicle 4. The bracket 54 includes a plurality of spaced apertures 55 for receiving the pin 53 to allow adjustment.

The drive vehicle 4 is of a conventional manufacturer and is partly illustrated in FIG. 1. The drive vehicle 4 includes a vehicle body 59 operably carried by a set of four wheels 60 with only the front wheels showing in FIG. 1. The vehicle 4 may be any conventional type multi-wheeled or tracked vehicle or tractor that is self-propelled by a gasoline engine or the like and which can operably maneuver during use under the control of an operator.

The vehicle 4 will normally include at least two wheels which are turnable by an operator by movement of a steering wheel or joy stick. The turning wheels may be the front wheels, the rear wheels or all four wheels. It is also preferred that the drive mechanism for the vehicle 4 have a conventional power take off, not shown but which are well known in the art, that operably connects with a universal joint 62 for driving the mower blades 43 during use of the mower 1. The drive vehicle 4 is also suitably configured to receive the mounting and support assembly 5 which is shown in FIGS. 1, 2 and 3. The mounting and support assembly 5 includes opposed plates 64 which are attached to the vehicle frame or body 59 by bolts 65.

A footrest 67 is also connected to and extends forward of the vehicle 4 at a hinge 68. The footrest 67 has a raised position which is partially shown in FIG. 1 that allows raising of the mower deck 3, as will be described later, and a lowered position wherein the footrest 67 supports the feet of a user of the vehicle 4 during operation thereof, while protecting the feet of the user from moving equipment beneath the footrest 67. In this manner the footrest 67 acts in cooperation with the cover 45 to protect moving parts of the mower 1 that are located above the housing 10 during operation. The footrest 67 also allows the deck 3 to be placed comparatively close to the vehicle 4, while protecting the feet of the user, so that the deck 3 has a relatively low profile and so that the mower 1 as a whole, has comparatively good stability, cutting ability and maneuverability.

The mounting and support assembly 5 is perhaps best seen in FIG. 2, but parts thereof are also seen in FIGS. 1, 3 and 7. The mounting and support assembly 5 includes a mounting frame 71, a pair of push bars 72 and 73 a pair of hangers 74 and 75 and a lift bar 76. The lift bar 76 extends from side to side along the rear of the deck 3 and is rotatable along a major axis thereof.

The mounting frame 71 includes the side plates 64 and an upper stabilizing bar 79 and a lower stabilizing bar 80 extending between and securely attached to the mounting plates 64. Located between the bars 79 and 80 is a support bar 81 also extending between and secured to the plates 64.

Each of the push bars 72 and 73 include elongate rods 84 fixedly attached at one end thereof to a generally U-shaped mounting member 85 and at an opposite end thereof, each is pivotally and swivelly attached to a clevis support bracket 86 by a universal joint 87. The mounting members 85 are mounted on the support bar 81 so as to be rotatable thereabout and are held from inadvertently disengaging from the support bar 81 by clevis pins 89.

The pins 89 may be removed and the mounting members 85 raised relative to the support bar 81 to allow removal of the mower deck 3 from the remainder of the vehicle 4. Removal of the mower deck 3 also requires disengagement of the shock assembly pin 51 and disengagement of the drive shaft 34 above the U-joint 62 from the main power takeoff of the vehicle 4 by conventional means.

A gusset 90 extends between the innermost end of each mounting member 85 and the rod 84 associated therewith to provide additional strength and support to the rods 84. Each of the hangers 74 and 75 include a pair of spaced elongate plates positioned to hang at substantial angles, almost right angles, with respect to a respective rod 84 and be pivotally secured thereto by a clevis pin 94.

Each of the pair of plates 93 are connected near the top thereof by a bar 95 spaced from the pin 94. Secured to the top of each bar 84 and positioned rearward of the plates 93 is a U-shaped mount 97. A pin 98 passes through both sides of the mount 97 and secures one end of a spring 99. An opposite end of the spring 99 is secured to the rod 95 such that there is a biasing force applied by the spring 99 to each pair of plates 93 to urge the top of the plates 93 rearwardly or toward the vehicle 4. It is foreseen that another type of mechanism could be utilized to effectively apply such a biasing force such as a counter weight or the like.

A finger operated handle 100 is secured to and extends between each pair of elongate plates 93. The handle 93 allows an operator to selectively rotate the top of the pair of plates 93 forward and thus a hanger 74 and 75 forward by countering the biasing effect of the associated springs 99.

Each of the plates 93 also includes an elongate slot 103 which each have a generally vertical orientation during use. Each slot 103 is accessible through an opening or mouth 104 that opens to the front or away from the vehicle 4. Each slot 103 has lower loop portion 105 that extends below the mouth 104. It is foreseen that the direction of opening of the mouth 104 could be to the rear if the direction of biasing of the hangers 74 and 75 is revised.

The rotatable lift bar 76 extends along a substantial portion of the rear of the mower housing 10 from side to side thereof. The lift bar 76 is round and comparatively elongate. A pair of U-shaped hanger brackets 108 are spaced from one another and are slideably received over the lift bar 76. Clevis pins 109 secure the lift bar 76 in the brackets 108. Each of the brackets 108 is fixedly fastened by welding or the like to the rear of the housing 10 along the skirt 21. A spacer 110 is positioned on the interior of each bracket 108 at the location where an associated pin 109 passes therethrough so as to maintain proper spacing of each side of the bracket 108. In this manner the lift bar 76 is rotatable about the central elongate axis thereof relative to the rear of the housing 10.

Fixedly secured to, extending outwardly therefrom and being spaced from one another along the lift bar 76 are three sets of pairs of lever arms 113, 114 and 115. Also fixedly attached to, extending outwardly therefrom and being spaced along the bar 76 are another set of lever arms 118 and 119. The lever arms 118 and 119 extend at substantial angles to the bar relative to lever arms 113, 114 and 115, which angles are approximately 90°. Extending outwardly from distal ends of each of the lever arms 118 and 119 on either side thereof are a pair of pins or slot followers 120. Each of the slot followers 120 is a round elongate peg that is sized and shaped to fit within the hanger slots 103. Likewise each of the lever arms 118 and 119 are spaced so that the slot followers 120 are simultaneously located within the hanger slots 103 of the hangers 74 and 75.

Spaced outwardly sideways from each end of the bar 76 is a bracket 123 attached to the housing 10 and supporting a roller 124. The rollers 124 help support the mower deck 3, when removed from the vehicle 4, and allow it to be freely rolled relative to the vehicle 4, so that it can easily be properly located for attachment of the mounting and support assembly 5 to the vehicle 4. The rollers 124 also help in preventing scalping at the rear corners of the mower deck 3.

As will be discussed in greater detail below, it is noted that rotation of the lift bar 76 about the central axis thereof and when the slot followers 120 are located in the hanger slots 103, causes the lever arms 118 and 119 to effectively raise or lower the rear of the mower deck housing 10 relative to the vehicle 4 and to the ground supporting the vehicle 4.

The mower height adjustment assembly 13 includes the lift bar 76 discussed above, a handle mechanism 127 and a wheel adjustment mechanism 128 associated with each of the caster wheels 11 and 12.

The handle mechanism 127 is seen in an exploded view in FIG. 7 and assembled in FIG. 1.

The handle mechanism 127 includes a handle mount 130 which is fixedly secured by bolts 131 to the housing upper plate 20 so as to extend upwardly therefrom. The handle mount 130 includes a lower base plate 132, an intermediate leverage plate 133 and a U-shaped structure 134. The leverage plate 134 includes a central aperture 135. The U-shaped structure 134 includes a series of spaced apertures 137 along the upper side thereof.

Secured by a bolt 138 passing through the aperture 135, a spacer 139 and a aperture 140 at the lower end of a lower handle rod 141 is a bolt 138 secured by a nut 142. The lower handle rod 141 also includes a second aperture 145 spaced from the first aperture 140 and receiving a pin 146 therethrough. Also spaced along the lower handle arm 141 are a pair of centrally bored tabs 147 and 148. Attached to the upper end of the lower handle arm 141 is an L-shaped upper handle arm 150 secured in place by a bolt 151. A hand grip 153 is located on one side of the upper handle arm 150. The pin 146 also passes through an aperture 156 in a handle link 157. An aperture 158 is located on the end of the link 157 opposite the aperture 156 and is operably received between distal ends of the lever arms 114. The lever arms 114 include apertures 160 through which a pin 161 is received. The pin 161 is also pivotally received through the aperture 158 in the link 157 so as to connect the upper and lower handle arms 141 and 150 to the lift bar 76.

A catch rod 164 is received through the tabs 147 and 148 so as to be slideably received therein and operably is received in one of the apertures 137 in the top of the handle mount 130 as well as a slot 163 in the upper handle arm 150. In operation, a user pulls the catch rod 164 upwardly under control of a stop and return spring 165 located under the tab 148 and along the rod 164, so that the lower end of the catch rod 164 clears the apertures 137 allowing the user to swing the handle arm 150 between front and rear so as to reposition the catch rod 164 over a different aperture 137 at which time the rod 164 is released and returned by biasing of the spring 165 to the different aperture 137. As will be discussed later, this operation effectively translates rotational movement to the lift bar 76 which adjusts both the rear cutting height and front cutting height of the mower in one simultaneous movement. Although a manually operated handle is utilized as a single location height adjustment device in the present embodiment, it is foreseen that other types of devices such as electric switches or manually operated hydraulic or air switching devices could be alternatively utilized.

Each of the front wheel adjustment mechanisms 128 include link shafts 168 having apertures 169 and 170 located near opposite ends thereof. Sleeved on each shaft 168 is a compression spring 172 operably positioned by a washer band 173 secured along the shaft 168. The end of the shaft 168 associated with the aperture 169 is pivotally secured at apertures 175 located in distal ends of respective links 113 and 115 by clevis pins 174. A tab 176 having an aperture 177 therethrough is fixedly secured to an L-shaped member 178 (FIG. 1), so as to be supported upright thereby. The end of the link shaft 168 associated with the aperture 170 is passed through the tab aperture 177 such that the tab 176 abuts against one end of the spring 172.

A mounting bracket 180 is secured to the top surface of the housing 10. A lift channel 181 is C-shaped and includes a depending ear 182 on one side thereof. An aperture 183 in the channel 181 receives a pin 184 which is also received through an aperture 185 in the mounting bracket 180 so as to pivotally connect the lift channel 181 to the mounting bracket 180.

The ear 182 in turn has an aperture 185 that receives a pin 186 which is also received in the aperture 170 in the shaft 168 so as to pivotally secure the shaft 168 to the lift channel 181. Forward of a set of apertures 183 is a second set of apertures 187 which each receives a bolt 188 therethrough. The bolt 188 is also received through a set of apertures 189 in a caster yoke 190 so as to allow pivotal motion of the caster yoke 190 relative to the lift channel 181.

Each mounting bracket 180 includes a second set of apertures 192 mounted below the first set of apertures 185 therein. A stabilizer arm 193 having apertures 194 and 195 at opposite ends thereof. The caster yoke 190 includes a second set of apertures 196 below the first set of apertures 189 thereof. A pin 197 pivotally connects the mounting bracket at apertures 192 to the stabilizer arm 193 at the apertures 194. Likewise pin 198 connects the stabilizer arm 193 at the apertures 195 to the caster yoke 190 at the apertures 196.

The caster yoke 190 includes a generally vertically aligned bore 200 therethrough. Each of the caster wheels 11 and 12 include a clevis 202 pivotally attached to a respective wheel 11 and 12 by a pin 203. Each clevis 202 includes a pivot rod 205 extending upwardly therefrom which is sized and shaped to be received in associated bore 200 of the caster yoke 190. Positioned in the bottom and top of each bore 200 is a pair of bearings 206 and 207 to allow rotation of the pivot rod 205 within the bore 200. The bearing 207 is held in place by a bearing cap 208 and in turn by a fastener 209.

In use, the deck 3 is mounted on the vehicle 4 by rolling the deck 3 on wheels 11 and 12 and rollers 124 until the pusher bar mounting members 85 are aligned with the support bar 81 at which time the mounting members 85 are placed over the bar 81 and secured with pins 89. The drive shaft 34 is attached to the vehicle power take off at joint 62 which uses a conventional push pin or alternatively a slide collar for release. The shock absorbing assembly 14 is attached to the deck 3 by pin 51 and to the vehicle 4 by pin 53. The foot rest 67 is lowered. The rear of the deck 3 is then raised until the slot followers 120 engage the hangers 74 and 75 at which time the hangers 74 and 75 swing rearwardly under lifting pressure and allow the slot followers 120 to enter the slots 103. The slot followers 120 are thereafter maintained in the slots 103 until it is desired to raise the deck 3 as described below or remove the deck 3 from the vehicle 4 in which case the process is reversed.

The cutting height adjustment mechanism 13 is then manipulated, if necessary, to set a new cutting height. The operator manually raises the catch rod 164 until the lower end thereof clears the current aperture 137. The grip 153 is then urged frontwardly or rearwardly to lower or raise the cutting height. When the selected height is obtained the catch rod 164 is returned to one of the apertures 137 that is associated with that height.

When the grip 153 is moved, the arms 141 and 150 pivot about the bolt 138 operably moving the link 156. The link 156 in turn moves the lever arm 114 so as to rotate the lift bar 76. The lift bar 76 in turn rotates the lever arms 113 and 115 and the lever arms 118 and 119.

Rotation of the lever arms 113 and 115 cause movement of the link shafts 168 which in turn pivot the lift channels 181 about the pins 184. Movement of the lift channels 181 causes reductive movement of the castor yokes 190 so that the latter swing upwardly or downwardly thereby lowering or raising the deck 3 on each side of the front of the deck 3 relative to the wheels 11 and 12.

At the same time rotation of the lever arm 118 and 119 effect a lowering or raising of the deck 3 as the slot followers 120 bias against the slot lower loop portion 105.

When the mower 1 is stationary for height adjustment the slot followers 120 are normally at the lower end of the slots 103, but are free to move upward along the slots 103 during operation to allow articulation of the deck 3 to allow the deck 4 to better follow the contour of the ground being traversed thereby rather than being tied to following movement of the vehicle 4. This helps avoid scalping. Likewise, the height adjustment is for even terrain whereon the vehicle 4 and deck 3 set on approximately the same plane whereas the movement of the slot followers 120 in the slots 103 adjusts for uneven terrain between the vehicle 4 and deck 3, as well as uneven terrain being covered by the deck 3 itself.

Figure 5:
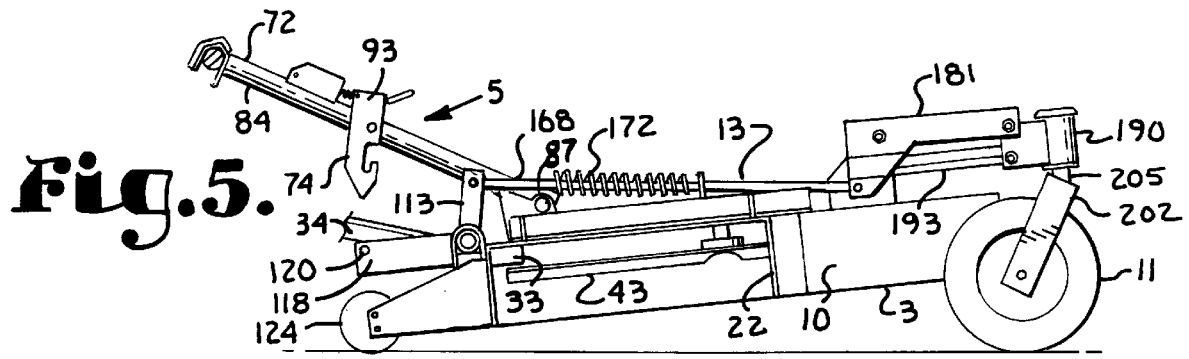
FIG. 5 is a fragmentary and side elevational view of the mower deck and mounting assembly showing the mower deck in an intermediate configuration between the cutting configuration and a raised configuration thereof.

The deck 3 can be easily and conveniently raised without need of tools for cleaning, repair, maintenance or the like. The mower 1 is shown in a cutting or lowered configuration in FIG. 1. To change configurations the foot rest 67 is raised and the handles 100 (see FIG. 3) are manually depressed by the operator, thereby swinging the hangers 74 and 75 about the pivot pins 94 and thereby urging the slots 103 rearwardly and the slot followers 120 from the slots 103. The slot followers 120 may need to be raised manually slightly while each hanger 74 or 75 is manipulated. The resulting position is seen in FIGS. 5 and 3 with the slot followers 120 no longer in the slots 103. The shock absorber assembly 14 is also disconnected at one end thereof by removing the pin 51.

Figure 6:
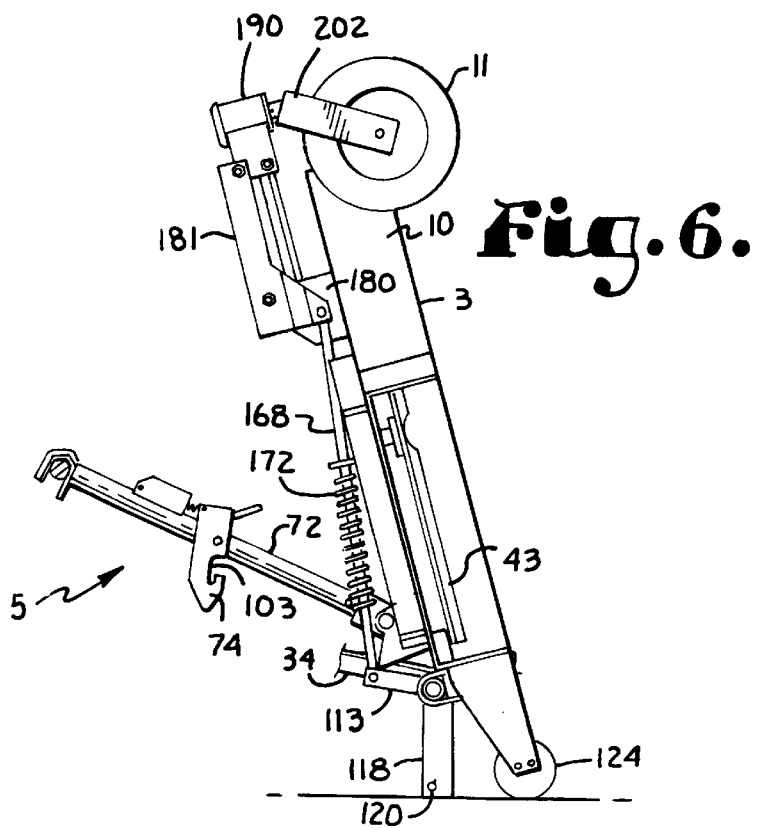
FIG. 6 is a fragmentary and side elevational view of the mower deck and mounting assembly with the mower shown in the raised configuration thereof.

The deck 3 can now be pivoted relative to the vehicle 4 and, in particular, is pivoted relative to the pusher bars 72 and 73 at the pins 87. This allows the deck to be raised to an upright service or flipped up position, as seen in FIG. 6, to expose the underside of the deck 3 for any required purpose.

To reuse the mower 1 for cutting, the procedure is reversed with the rear end being raised until the slot followers 120 engage the hangers 74 and 75 and then enter the slots 103 within which they are then held by the biasing force of the springs 99. The hangers 74 and 75 are automatically biased by the springs 99 to reconnect with the slot followers 120 as the slot followers 120 are raised. In this manner the rear connection of the slot followers 120 to the hangers 74 and 75 is both quick release and quick reconnecting.

It is to be understood that while certain forms of the present invention have been illustrated and described herein, it is not to be limited to the specific forms or arrangement of parts described and shown.

What is claimed and desired to be secured by Letters Patent is as follows:

1. A front mounted mower for attachment to a motorized vehicle comprising:

a) a mower deck having a mowing configuration wherein the deck is positioned to cut vegetation and a service configuration wherein an underside of the deck is easily accessible;

b) a mowing blade rotatably supported by said deck and including a drive mechanism for rotating the blade during operation;

c) a pair of laterally spaced deck support wheels connected to said deck at a front end thereof;

d) a deck mounting and support assembly for operably connecting said deck to the vehicle at a pivotal connection; said support assembly including a pair of spaced pusher bars pivotally attached near a first end thereof to said deck and adapted to be joined to the vehicle near a second end thereof; each of said pusher bars including a hanger pivotally connected to and positioned along a respective one of said pusher bars in spaced relation to the pivotal connection of said pusher bars with said deck; each of said hangers having an elongate generally vertically aligned slot; and e) a pair of slot followers each being operably received in a respective one of said slots and being mounted on said deck; said slot followers allowing opposite sides of the rear of said deck to articulate to follow the terrain of the ground being traversed by the mower as the slot followers move in said slots.

2. The mower according to claim 1 including the motorized vehicle.

3. The mower according to claim 1 wherein:

a) of said each pushers bars is swivelly connected to said deck by a universal joint.

4. The mower according to claim 1 wherein:

a) each of said slots includes an open mouth on a first side of each slot for removeably receiving each of such respective slot followers.

5. The mower according to claim 4 including:

a) a biasing mechanism connected to each of said slots and operably biasing a respective one of said slot followers against a second side of each of said slots.

6. A mower for cutting vegetation comprising:

a) a motorized vehicle for propelling the mower;

b) a mower deck including a housing and at least one cutting blade rotatably mounted on an underside of the housing; said blade being connected by a rotary assembly to said motorized vehicle to rotate said blade during operation of said mower;

c) a mounting and support assembly operably connecting said motorized vehicle with said deck; said support assembly including a support bar attached to and extending laterally with respect to said vehicle; said support assembly further including a pair of laterally spaced pusher bars, each being pivotally connected at one end thereof to said support bar and connected swivelly at an opposite end thereof to said housing; each of said pusher bars including a hanger pivotally joined thereto and intermediately positioned thereaIong; each of said hangers having a generally vertically aligned slot with an forwardly opening mouth; each of said hangers also being joined with a respective pusher bar by a biasing device so as to bias the hanger slot mouth toward the slot follower;

d) a pair of castor wheels each being positioned on opposite sides of the front of said deck housing;

e) a height adjustment mechanism including an elongate lift bar that is rotatably joined to a rear of the deck housing so as to be rotatable about an elongate axis thereof and extend laterally with respect to the deck housing; said lift bar including first, second, third, fourth and fifth lever arms extending outwardly therefrom; each of said first and second lever arms having slot followers attached near a distal end thereof; said slot followers sized and shaped to be received in and slide along a respective slot in one of said hangers; said slot followers being positioned in said slots during a cutting operation of said mower and being removed from said slots by application of manual pressure to said hanger to urge said hanger against said biasing device; when said slot followers are not positioned in said slots, said deck is rotatable about the connection of said pusher bars with said housing from a lowered cutting configuration to a raised service configuration; said third lever arm being joined by a first linkage to a manually operated height adjustment device to functionally allow an operator to rotate said lift bar by movement of said height adjustment device; said fourth and fifth lever arms being connected by second and third linkages to said wheels respectively, such that movement of said height adjustment device by a user operably rotates said lift bar and moves the slot followers relative to the slots so as to raise or lower the rear of the deck housing relative to said motorized vehicle while simultaneously raising or lowering the wheels relative to the deck by operation of the fourth and fifth lever arms acting through the second and third linkages in such a way as to simultaneously adjust the set cutting height of the mower deck at both the front and back of the deck on both sides thereof;

f) a shock assembly removably joined at opposite ends thereof to said vehicle and said mower housing to help reduce sudden movement therebetween; and g) a footrest hingedly connected to said vehicle and covering at least a portion of said mounting and support assembly when said footrest is in a lowered position and having a raised position allowing access by a user to said mounting and support assembly.

7. A front mounted mower for attachment to a motorized vehicle comprising:

a) a mower deck having a mowing configuration wherein the deck is positioned to cut vegetation and a service configuration wherein an underside of the deck is easily accessible;

b) a mowing blade rotatably supported by said deck and including a drive mechanism for rotating the blade during operation;

c) a pair of laterally spaced deck support wheels connected to said deck at a front end thereof;

d) a deck mounting and support assembly for operably connecting said deck to the vehicle at a pivotal connection; said support assembly including a pair of spaced pusher bars pivotally attached near a first end thereof to said deck and adapted to be joined to the vehicle near a second end thereof; each of said pusher bars including a hanger pivotally connected to and positioned along a respective one of said pusher bars in spaced relation to the pivotal connection of said pusher bars with said deck; each of said hangers having an elongate generally vertically aligned slot;

e) a pair of slot followers each being operably received in a respective one of said slots and being joined to said deck; said slot followers allowing opposite sides of the rear of said deck to articulate to follow the terrain of the ground being traversed by the mower as the slot followers move in said slots; and f) an elongate laterally extending lift bar having an elongate axis of rotation and being rotatably mounted to said deck near the rear thereof; said lift bar including a pair of lever arms with one of said slot followers positioned near the distal end of each lever arm.

8. The mower according to claim 7 wherein:

a) each of said hangers includes an forwardly facing opening to said slot associated therewith and each of said hangers is biased during operation to urge a respective one a said hangers toward a respective one of said slot followers to urge the slot follower to remain in the slot; and b) each hanger includes a handle to allow an operator to manually urge the hanger in the opposite direction to that which the hanger is biased so as to allow each slot follower to be released from an associated one of said slots.

9. The mower according to claim 8 wherein:

a) each pusher bar has attached thereto a spring near said first end thereof; each spring of said springs being attached near a second end of said spring to a respective hanger in spaced relation to a pivotal juncture of a respective one of said hangers to a respective one of said pusher bars so as to bias said hanger to retain a respective one of said slot followers in said slot during operation.

10. The mower according to claim 8 wherein:

a) said mower deck has a lowered cutting configuration and a raised service configuration allowing easy access to an underside of said deck; and b) when said slot followers are positioned in said slots, said deck is in the cutting configuration and when said slot followers are removed from said slots said deck is pivotal about said pivotal connection to allow said deck to be raised from the cutting configuration to the service configuration thereof.

11. The mower according to claim 10 including:

a) a third lever arm attached to said lift bar;

b) a height adjustment device connected to said third lever arm and operably allowing a user at a single location to cause rotation of said lift bar; and wherein:

c) rotation of said lift bar rotates the lever arms associated with said slot followers, thereby adjusting a set cutting height of the rear of said deck.

12. The mower according to claim 11 including:

a) said lift bar includes fourth and fifth lever arms; each of said fourth and fifth lever arms being connected to a respective front wheel by a linkage; said linkage each including a pivotal yoke allowing each wheel to be raised and lowered relative to said deck; each of said yokes being operably pivoted through said linkage by rotation of said lift bar such that, when a user manipulates said height adjustment device, the set cutting height of both the front and the rear of the deck is adjusted on both sides simultaneously.

13. The mower according to claim 12 wherein each of said linkages includes:

a) a pair of link shafts; each link shaft being pivotally connected at a first end to said fourth and fifth lever arms respectively;

b) a mounting bracket secured to an upper surface of said deck;

c) an elongate lift channel having a first pivotal connection near a rear end thereof to said mounting bracket, said lift channel having a second pivotal connection near the rear end thereof and spaced from said first pivotal connection, said second pivotal connection being joined to said link shaft near a second end thereof;

d) a stabilizer arm generally parallel to said lift channel and pivotally joined near a first end thereof to said mounting bracket;

e) each of said wheel yokes being joined at spaced locations to a respective lift channel near a second end thereof and to said stabilizer bar near a second end thereof, such that rotary movement of said fourth and fifth lever arms functionally results in raising and lowering of respective wheels relative to said deck.

* * * * *